(12) United States Patent
Chae et al.

(10) Patent No.: US 9,612,471 B2
(45) Date of Patent: Apr. 4, 2017

(54) DISPLAY DEVICE

(71) Applicant: Samsung Display Co., Ltd., Yongin-si, Gyeonggi-Do (KR)

(72) Inventors: Soojung Chae, Seoul (KR); Hyangyul Kim, Hwaseong-si (KR); Sujin Lee, Siheung-si (KR); Jeongho Lee, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/738,158

(22) Filed: Jun. 12, 2015

(65) Prior Publication Data
US 2016/0147112 A1 May 26, 2016

(30) Foreign Application Priority Data
Nov. 24, 2014 (KR) .................. 10-2014-0164621

(51) Int. Cl.
*G02F 1/1335* (2006.01)
*G02F 1/1343* (2006.01)
(Continued)

(52) U.S. Cl.
CPC .. *G02F 1/133514* (2013.01); *G02F 1/134309* (2013.01); *G02B 5/201* (2013.01);
(Continued)

(58) Field of Classification Search
CPC ......... G02F 1/134363; G02F 1/134309; G02F 1/13439; G02F 1/133514; G02F 1/1343; G02F 1/1333; G02F 1/1335; G02F 1/136; G02F 1/1368; G02F 1/133345; G02F 1/133512; G02F 1/134336; G02F 1/136286; G02F 1/136227; G02F 1/133711; G02F 1/1362; G02F 1/136209; G02F 1/133371; G02F 2001/134372; G02F 2001/134318; G02F 2001/136222; G02F 2201/52; G09G 2300/0426; G09G 3/3648; G09G 3/3607; G09G 3/36
(Continued)

(56) References Cited

U.S. PATENT DOCUMENTS 7,808,595 B2 * 10/2010 Chae ................. G02F 1/134363 349/106
2013/0154911 A1 * 6/2013 Chen ................. G02F 1/134336 345/87

FOREIGN PATENT DOCUMENTS

| KR | 10-2008-0021381 A | 3/2008 |
| KR | 10-2011-0024596 A | 3/2011 |
| KR | 10-2013-0015474 A | 2/2013 |

* cited by examiner

*Primary Examiner* — Thoi Duong
(74) *Attorney, Agent, or Firm* — Robert E. Bushnell, Esq.

(57) ABSTRACT

A display device, having relatively high side visibility and transmittance, includes a first substrate having a plurality of red, green, and blue pixel regions; a lower electrode disposed on the red, green, and blue pixel regions; and an upper electrode disposed on the red, green, and blue pixel regions. The upper electrode is insulated from the lower electrode, and includes a plurality of upper branch electrodes disposed on the lower electrode. A width and height of the upper branch electrode in at least one of the red, green, and blue pixel regions are respectively different from a width and a height of the upper branch electrode in another of the red, green and blue pixel regions.

11 Claims, 7 Drawing Sheets

(51) Int. Cl.
   *G02B 5/20* (2006.01)
   *G02F 1/1337* (2006.01)
(52) U.S. Cl.
   CPC .................. *G02F 1/133707* (2013.01); *G02F 2001/134345* (2013.01)
(58) Field of Classification Search
   USPC ........ 345/92, 690, 87, 103; 349/106, 33, 43, 349/42, 139, 138, 143, 110, 144, 141, 145
   See application file for complete search history.

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 24 Nov. 2014 and there duly assigned Serial No. 10-2014-0164621.

BACKGROUND OF THE INVENTION

Field of the Invention

Aspects of embodiments of the present invention relate to a display device, and more particularly, to a display device having relatively high transmittance.

Description of the Related Art

A liquid crystal display (LCD) device is a type of flat panel display (FPD) device which has been widely used these days. Such an LCD device includes two substrates having electrodes formed thereon and a liquid crystal layer interposed therebetween. Upon voltages being applied to the electrodes, liquid crystal molecules of the liquid crystal layer are rearranged, whereby the amount of transmitted light is adjusted.

Despite advantages of the LCD device such as slimness thereof, a relatively low level of side visibility thereof as compared to that of front visibility may be problematic. Accordingly, research on developing various types of liquid crystal arrangement schemes and driving schemes is being conducted in order to enhance the side visibility. In particular, an LCD device, in which two electrodes generating electric field are disposed on a single substrate, is gaining attention.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a display device having relatively high side visibility and transmittance.

According to an exemplary embodiment of the present invention, a display device includes a first substrate having a plurality of red, green, and blue pixel regions; a lower electrode disposed on the red, green, and blue pixel regions; and an upper electrode disposed on the red, green, and blue pixel regions. The upper electrode is insulated from the lower electrode, and includes a plurality of upper branch electrodes disposed on the lower electrode. A width and height of the upper electrode in at least one of the red, green, and blue pixel regions are respectively different from a width and a height of the upper branch electrode in another of the red, green and blue pixel regions.

The width and the height of the upper branch electrode in the green pixel region may be greater than the widths and the heights of the upper branch electrodes in the red and blue pixel regions, respectively.

The width and the height of the upper branch electrode in the red pixel region may be greater than the width and the height of the upper branch electrode in the blue pixel region, respectively.

The width and the height of the upper branch electrode in the red pixel region may be the same as the width and the height of the upper branch electrode in the blue pixel region.

The width of the upper branch electrode may be from about 0.5 to 2.0 micrometers (μm).

The height of the upper branch electrode may be from about 450 to 1000 angstroms (Å).

The lower electrode may have a width greater than the width of the upper branch electrode.

The display device may further include a thin film transistor (TFT) connected to the lower electrode or the upper electrode.

The display device may further include a red color filter disposed in the red pixel region, a green color filter disposed in the green pixel region, and a blue color filter disposed in the blue pixel region.

The red, green, and blue color filters may be disposed between the lower electrode and the first substrate.

The display device may further include a second substrate disposed to face the first substrate; and a liquid crystal layer interposed between the first and second substrates.

The display device may further include a light shielding member disposed on the first substrate or the second substrate.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
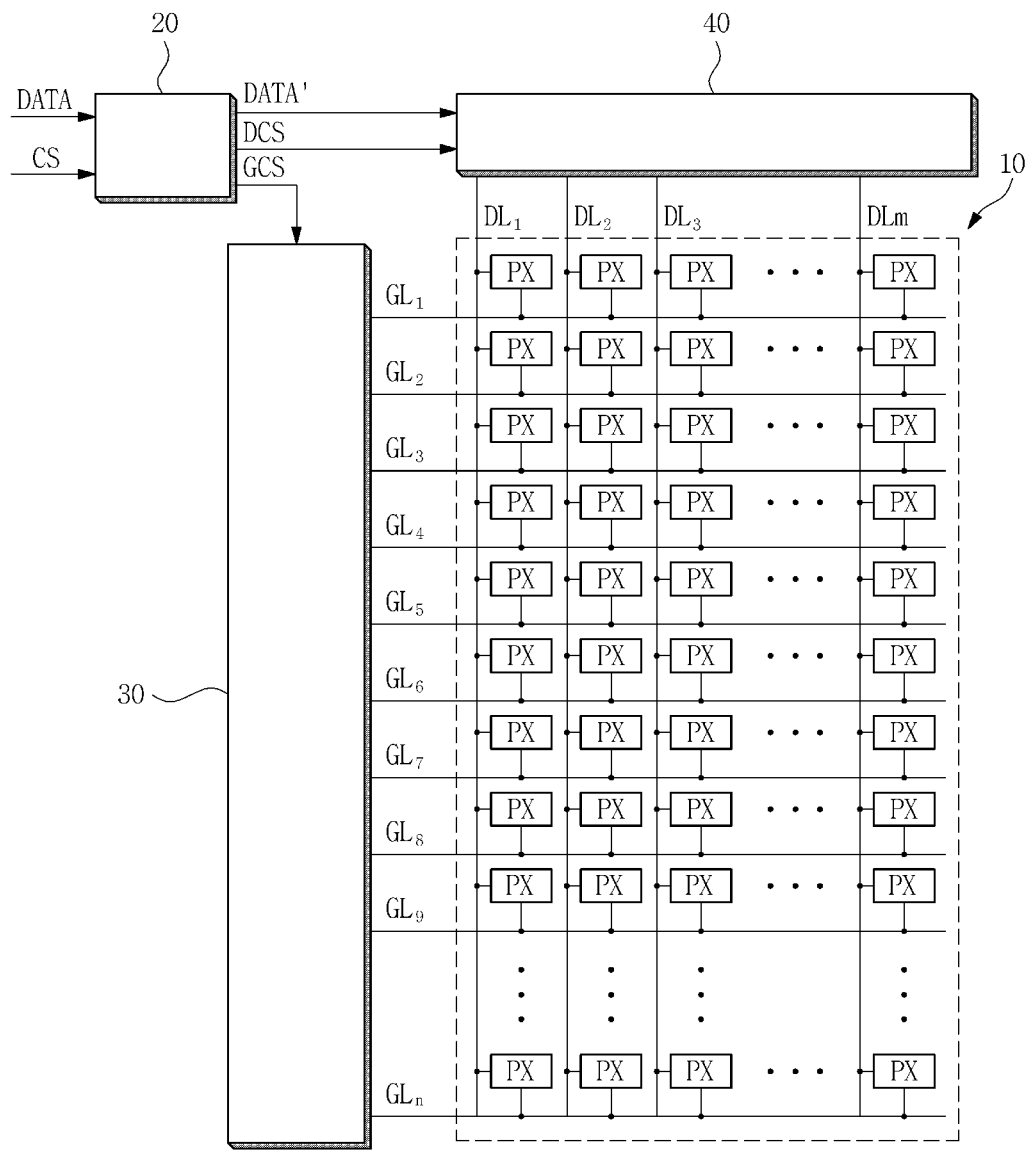
FIG. 1 is a block diagram illustrating a display device according to an exemplary embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "lower", "above," "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the inventive concept and may be modified according to the relevant art and the intention of an applicant. Therefore, the terms used herein should be interpreted as having a meaning that is consistent with their meanings in the context of the present disclosure, and is not intended to limit the invention. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is a block diagram illustrating a display device according to an exemplary embodiment of the present invention.

A display device according to an exemplary embodiment of the present invention may include a display panel 10 having a plurality of pixels PX, a control unit 20 processing an image signal DATA and a control signal CS, which are received externally, to output as various types of signals, a gate driver 30 supplying gate signals to gate lines $GL_1$ through $GL_n$, respectively, and a data driver 40 supplying data voltages to data lines $DL_1$ through $DL_m$, respectively.

The display panel 10 may include a plurality of gate lines $GL_1$ through $GL_n$ transferring gate signals in a row direction, respectively, a plurality of data lines $DL_1$ through $DL_m$ transferring data signals in a column direction, respectively, and a plurality of pixels PX arranged in a form of matrix (two dimensional array) in a region in which the gate lines and the data lines intersect with one another.

The control unit 20 may output a corrected image signal DATA' to the data driver 40 based on the externally received image signal DATA. In addition, the control unit 20 may supply a gate control signal GCS to the gate driver 30 and may supply a data control signal DCS to the data driver 40 based on the externally received control signal CS. For example, the control signal CS may be a timing signal such as a vertical synchronization signal Vsync, a horizontal synchronization signal Hsync, a clock signal CLK, and a data enable signal DE, and the image signal DATA may be a digital signal representing gradation of light output from the pixel PX.

The gate driver 30 may receive the gate control signal GCS from the control unit 20 supplied thereto to generate the gate signal, and may supply the gate signals to the pixels PX connected to the plurality of gate lines $GL_1$ through $GL_n$, respectively. As the gate signals are sequentially applied to the pixels PX, data voltages may be sequentially supplied to the pixels PX.

The data driver 40 may receive the data control signal DCS and the corrected image signal DATA' from the control unit 20, and may supply a data voltage corresponding to the corrected image signal DATA' to each of the pixels PX connected to the plurality of data lines $DL_1$ through $DL_m$, respectively, in response to the data control signal DCS.

Figure 2:
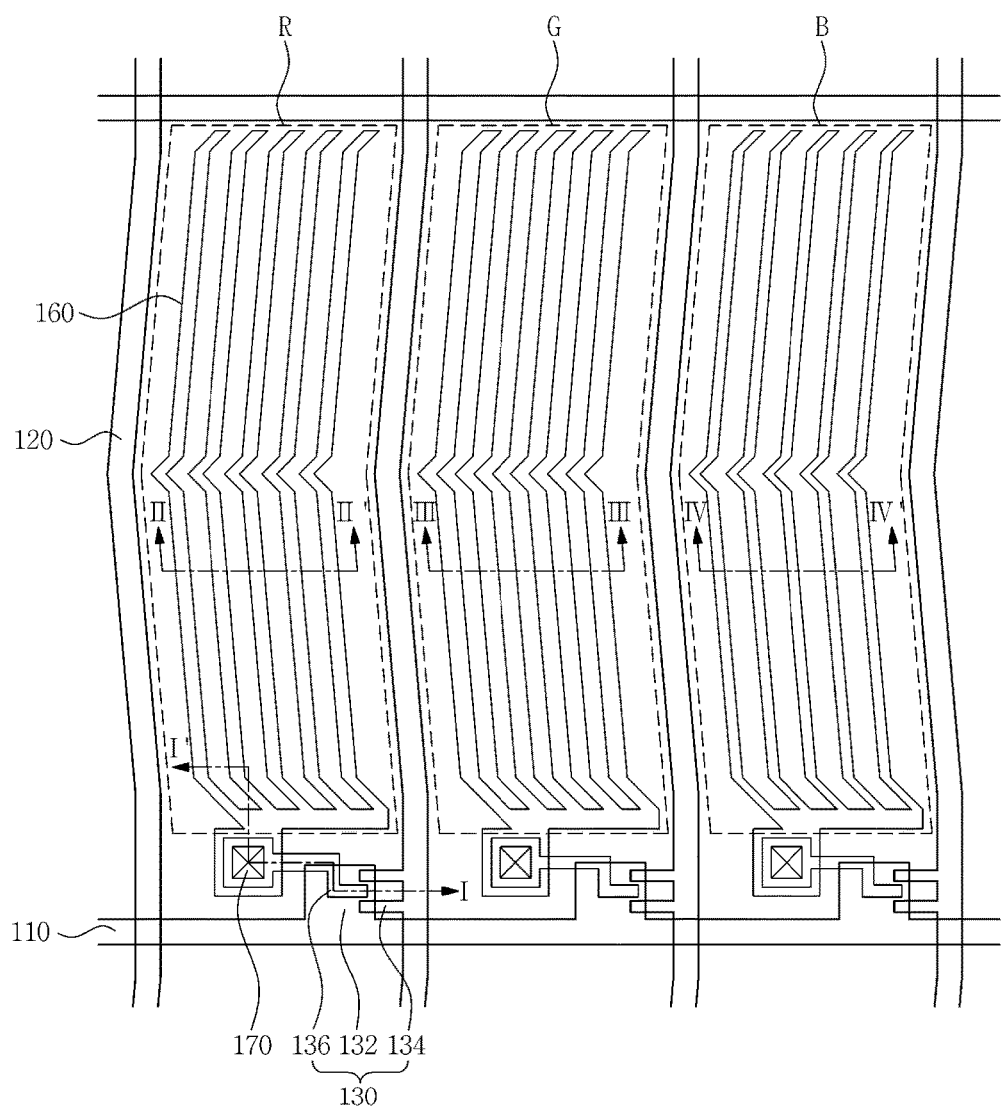
FIG. 2 is a plan view illustrating a display device according to an exemplary embodiment of the present invention.
Figure 3:
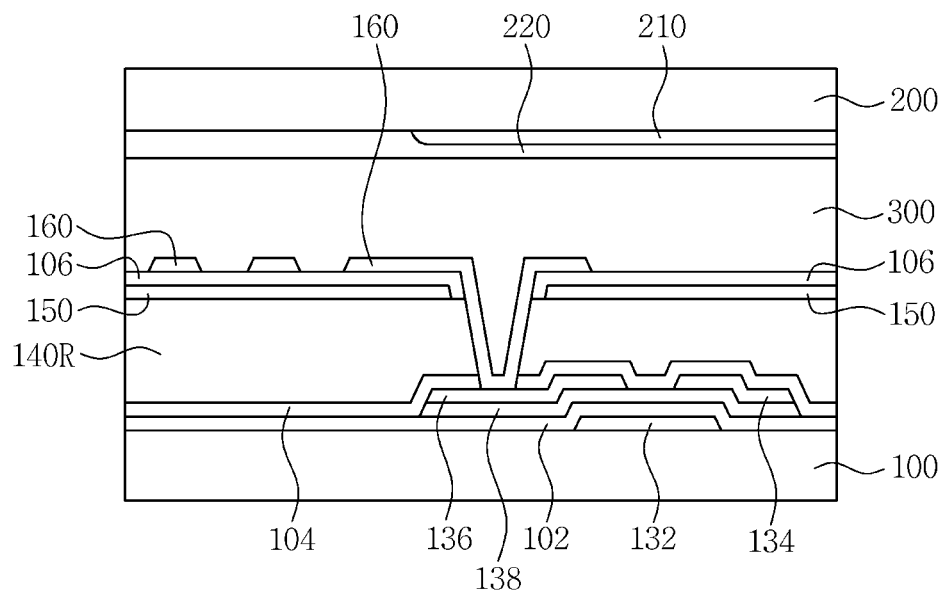
FIG. 3 is a cross-sectional view taken along line I-I' of FIG. 2.

FIG. 2 is a plan view illustrating a display device according to an exemplary embodiment of the present invention; and FIG. 3 is a cross-sectional view taken along line I-I' of FIG. 2.

A first substrate 100 may be formed of transparent glass, plastic, or the like, and may have a planar shape or a curved shape having a predetermined radius of curvature.

The first substrate 100 may have a plurality of red, green, and blue pixel regions R, G, and B, and the red, green, and blue pixel regions R, G, and B may be sequentially arranged on the first substrate 100.

The red, green, and blue pixel regions R, G, and B may be classified into the respective types thereof based on color filters disposed respectively therein, and the pixel region may be defined by a light shielding member 210 to be described below.

A gate line 110 may be disposed on the first substrate 100 in a horizontal direction. The gate line 110 may be formed an aluminum (Al) based metal such as Al or an Al alloy, a silver (Ag) based metal such as Ag or an Ag alloy, a copper (Cu) based metal such as Cu or a Cu alloy, a molybdenum (Mo) based metal such as Mo or a Mo alloy, chromium (Cr), tantalum (Ta), and titanium (Ti); however, the material forming the gate line 110 is not limited thereto, and the gate line 110 may have a multilayer structure including at least two conductive films having different physical properties.

A data line 120 may be disposed to be perpendicular with respect to the gate line 110, and may be insulated from the gate line 110 by a gate insulating film 102. The data line 120 may be formed of a refractory metal such as Mo, Cr, Ta, and Ti or an alloy thereof; however, the material forming the data line 120 is not limited thereto, and the data line 120 may have a multilayer structure including a refractory metal film and a low resistance conductive film.

The data line 120 may be bent into a V-shape, in each pixel area, in order to enhance transmittance of the display device. However, the shape of the data line 120 is not limited thereto, and the data line 120 may have a shape bent further from the above V-shape or may be provided in a straight line without being bent.

A thin film transistor (TFT) 130 may include a gate electrode 132 connected to the gate line 110, a source electrode 134 connected to the data line 120, and a drain electrode 136 connected to an upper electrode (a group of upper branch electrodes 160) through a contact hole 170. However, the configuration of the TFT 130 is not limited thereto, and the drain electrode 136 may be connected to the lower electrode 150, by way of example.

The gate electrode 132 may be insulated from the source electrode 134 and the drain electrode 136 by the gate insulating film 102, and a semiconductor layer 138 may be disposed between the gate insulating film 102 and the source electrode 134, and may be disposed between the gate insulating film 102 and the drain electrode 136. In addition, a first protective layer 104 formed of an organic insulating material, an inorganic insulating material, or the like, may be disposed on the source electrode 134 and the drain electrode 136.

Figure 4:
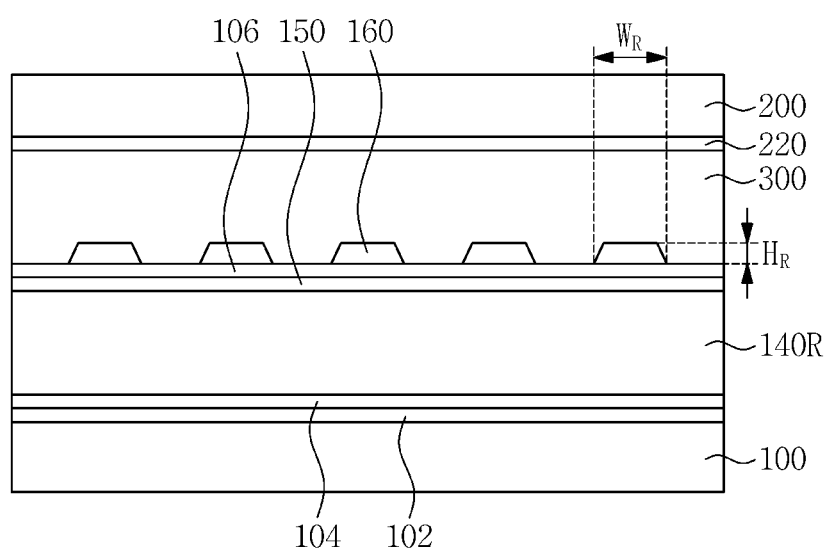
FIG. 4 is a cross-sectional view taken along line II-IF of FIG. 2.
Figure 5:
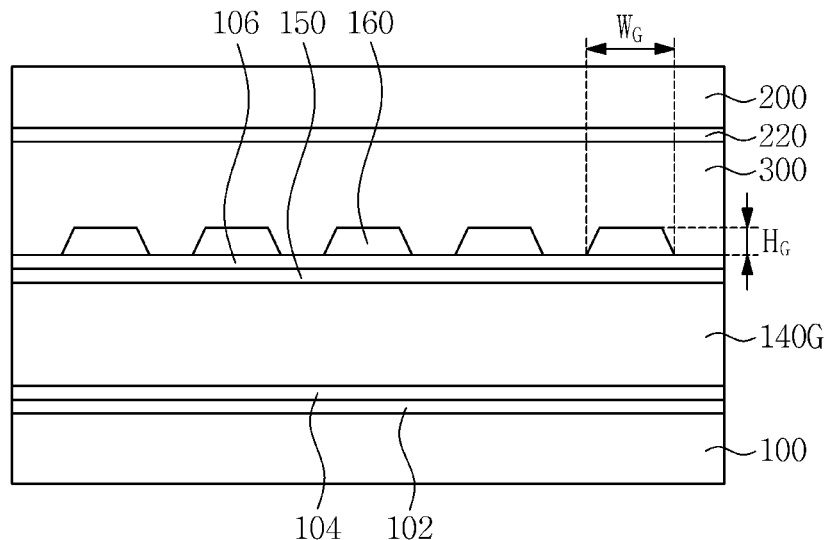
FIG. 5 is a cross-sectional view taken along line III-III' of FIG. 2.
Figure 6:
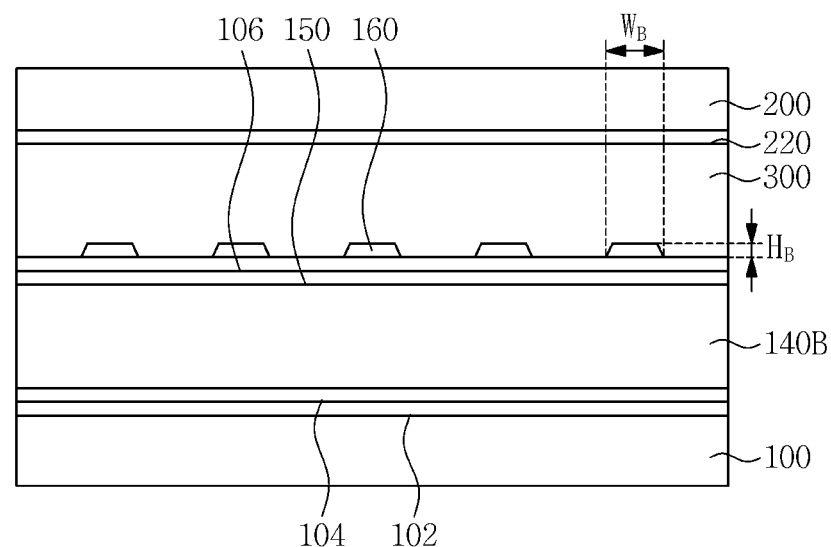
FIG. 6 is a cross-sectional view taken along line IV-IV' of FIG. 2.

The color filter may include a red color filter 140R disposed in a red pixel region R, a green color filter 140G disposed in a green pixel region G, and a blue color filter 140B disposed in a blue pixel region B with reference to FIGS. 4, 5, and 6, respectively.

The color filter 140R, 140G or 140B may be disposed on the first protective layer 104, and the red, green, and blue color filters 140R, 140G, and 140B may overlap one another based on the data line 120. However, the disposition of the color filter is not limited thereto, and the color filter 140R, 140G or 140B may be disposed on a second substrate 200.

Although not illustrated, a capping layer may further be disposed on the color filter 140R, 140G or 140B, and the capping layer may serve to prevent contaminants generated from the color filter from flowing into a liquid crystal layer 300. The capping layer may be formed of an inorganic or organic material such as silicon nitride (SiN$_x$), silicon oxide (SiO$_x$), or silicon oxycarbide (SiOC).

The lower electrode 150 may be disposed on the color filters 140R, 140G and 140B, and may be formed of a material having optical transparency and electrical conductivity such as indium tin oxide (ITO) or indium zinc oxide (IZO).

The lower electrode 150 may have a width greater than a width of an upper branch electrode 160 of an upper electrode to be described below, if the lower electrode 150 includes a plurality of branch electrodes. Alternatively, the lower electrode 150 may have a planar shape to be disposed on the entirety of the first substrate 100 as a continuous single sheet disposed on the lower electrode, or may have an aperture in a portion of the lower electrode 150 adjacent to the drain electrode 136. However, the shape of the lower electrode 150 is not limited thereto, and the lower electrode 150 may include a plurality of branch electrodes having a width greater than a width of the upper branch electrode 160 of the upper electrode.

The upper electrode may be disposed to be electrically insulated from the lower electrode 150 by a second protective layer 106 formed of an organic insulating material, an inorganic insulating material, or the like. The upper electrode may be formed of a material having transparency and electrical conductivity such as ITO or IZO in a manner similar to that of the lower electrode 150.

The upper electrode may include a plurality of upper branch electrodes 160 overlapping the lower electrode 150, and the branch electrode may be bent into a V-shape, in a pixel region, along the data line 120 as shown in FIG. 2. However, the shape of the branch electrode is not limited thereto, and the branch electrode may have a shape bent further from the above V-shape or may have a straight linear shape without being bent.

A description pertaining to a width and a height of the upper branch electrode 160 disposed in each of the red, green, and blue pixel regions R, G, and B will be provided with reference to FIGS. 4 through 6.

In the display device according to the exemplary embodiment, the lower electrode 150 may be a common electrode to which a common voltage having a predetermined level is applied from an external device, and the upper branch electrode 160 may be a pixel electrode to which a data voltage is applied from the drain electrode 136. When the common voltage and the data voltage are applied to the lower electrode 150 and the upper branch electrode 160, respectively, an electric field may be generated between the two electrodes, that is, the lower electrode 150 and the upper branch electrodes 160, and liquid crystal molecules of the liquid crystal layer 300 disposed on the lower electrode 150 and the upper branch electrodes 160 may be rearranged in a direction parallel with respect to the direction of the electric field. However, the type of the electrode is not limited thereto, and the upper branch electrode 160 may be a common electrode to which a common voltage is applied, and the lower electrode 150 may be a pixel electrode to which a data voltage is applied from the drain electrode 136.

Although not illustrated, an alignment film may further be disposed on the upper electrode, and may be a vertical alignment film or a photoaligned alignment film including a photopolymerization material. Such a photopolymerization material may be a reactive monomer or a reactive mesogen.

The second substrate 200 may be disposed to face the first substrate 100, and may be formed of transparent glass, plastic, or the like.

The light shielding member 210 may be disposed on the second substrate 200, and may define a pixel region through at least a portion of the light shielding member 210 overlapping the gate line 110, the data line 120, and the TFT 130. However, the disposition of the light shielding member 210 is not limited thereto, and the light shielding member 210 may be disposed on the first substrate 100.

The light shielding member 210 may serve to prevent light leakage by shielding the gate line 110, the data line 120, and the TFT 130.

A planarization layer 220 may be disposed on the light shielding member 210 and may be formed of an organic material. The planarization layer 220 may serve to provide a flat surface. However, a presence of the planarization layer 220 is not limited thereto, and may be omitted as necessary.

Although not illustrated, an alignment film may further be disposed on the planarization layer 220. The alignment film may be a vertical alignment film or a photoaligned alignment film including a photopolymerization material. Such a photopolymerization material may be a reactive monomer or a reactive mesogen.

The liquid crystal layer 300 may be interposed between the first and second substrates 100 and 200. The liquid crystal layer 300 may include a photopolymerization material, and such a photopolymerization material may be a reactive monomer or a reactive mesogen.

FIG. 4 is a cross-sectional view taken along line II-IF of FIG. 2; FIG. 5 is a cross-sectional view taken along line III-III' of FIG. 2; and FIG. 6 is a cross-sectional view taken along line IV-IV' of FIG. 2.

Referring to FIGS. 4 through 6, the upper branch electrode 160 may have different widths and heights in at least one of the red, green, and blue pixel regions R, G, and B.

The upper branch electrode 160 may have a width of from about 0.5 to 2.0 micrometers (μm) and a height of from about 450 to 1000 angstroms (Å), and the upper branch electrodes 160 disposed in the red, green, and blue pixel regions R, G, and B may have different widths and heights within the above ranges of width and height, respectively.

In detail, a width $W_G$ of the upper branch electrode 160 disposed in the green pixel region G may be greater than a width $W_R$ of the upper branch electrode 160 disposed in the red pixel region R, and may be greater than a width $W_B$ of the upper branch electrode 160 disposed in the blue pixel region B. In addition, a height $H_G$ of the upper branch electrode 160 disposed in the green pixel region G may be greater than a height $H_R$ of the upper branch electrode 160 disposed in the red pixel region R, and may be greater than a height $H_B$ of the upper branch electrode 160 disposed in the blue pixel region B.

The width $W_R$ of the upper branch electrode 160 disposed in the red pixel region R may be greater than the width $W_B$ of the upper branch electrode 160 disposed in the blue pixel region B. In addition, the height $H_R$ of the upper branch electrode 160 disposed in the red pixel region R may be greater than the height $H_B$ of the upper branch electrode 160 disposed in the blue pixel region B.

Transmittance of the green color filter 140G is higher than the transmittance of the red color filter 140R, and the transmittance of the red color filter 140R is higher than the transmittance of the blue color filter 140B disposed in the green, red, and blue pixel regions G, R, and B, respectively. However, in a case in which the upper branch electrodes 160 disposed in the red, green, and blue pixel regions R, G, and B, respectively, have the same width and height with one another, transmittance of the color filters 140B, 140G, and 140R disposed in the blue, green, and red pixel regions B, G, and R, respectively, may have levels of transmittance rising in this order. Accordingly, a level of overall transmittance of the display device may be reduced as a difference among levels of transmittance of the red, green, and blue pixel regions R, G, and B is increased.

The display device according to the exemplary embodiment may compensate for the difference among the levels of the transmittance of the color filters 140R, 140G, and 140B disposed in the red, green, and blue pixel regions R, G, and B, respectively, by varying widths and heights of the upper branch electrodes 160 disposed in the red, green, and blue pixel regions R, G, and B, respectively. In particular, higher efficiency in compensating for the difference among the levels of the transmittance of the color filters 140R, 140G, and 140B disposed in the red, green, and blue pixel regions R, G, and B, respectively, may be achieved by providing the upper branch electrodes 160 having widths and heights, both of which are different in the red, green, and blue pixel regions R, G, and B, than by providing upper branch electrodes 160 having widths and heights, one of which is different in the red, green, and blue pixel regions R, G, and B.

Figure 7:
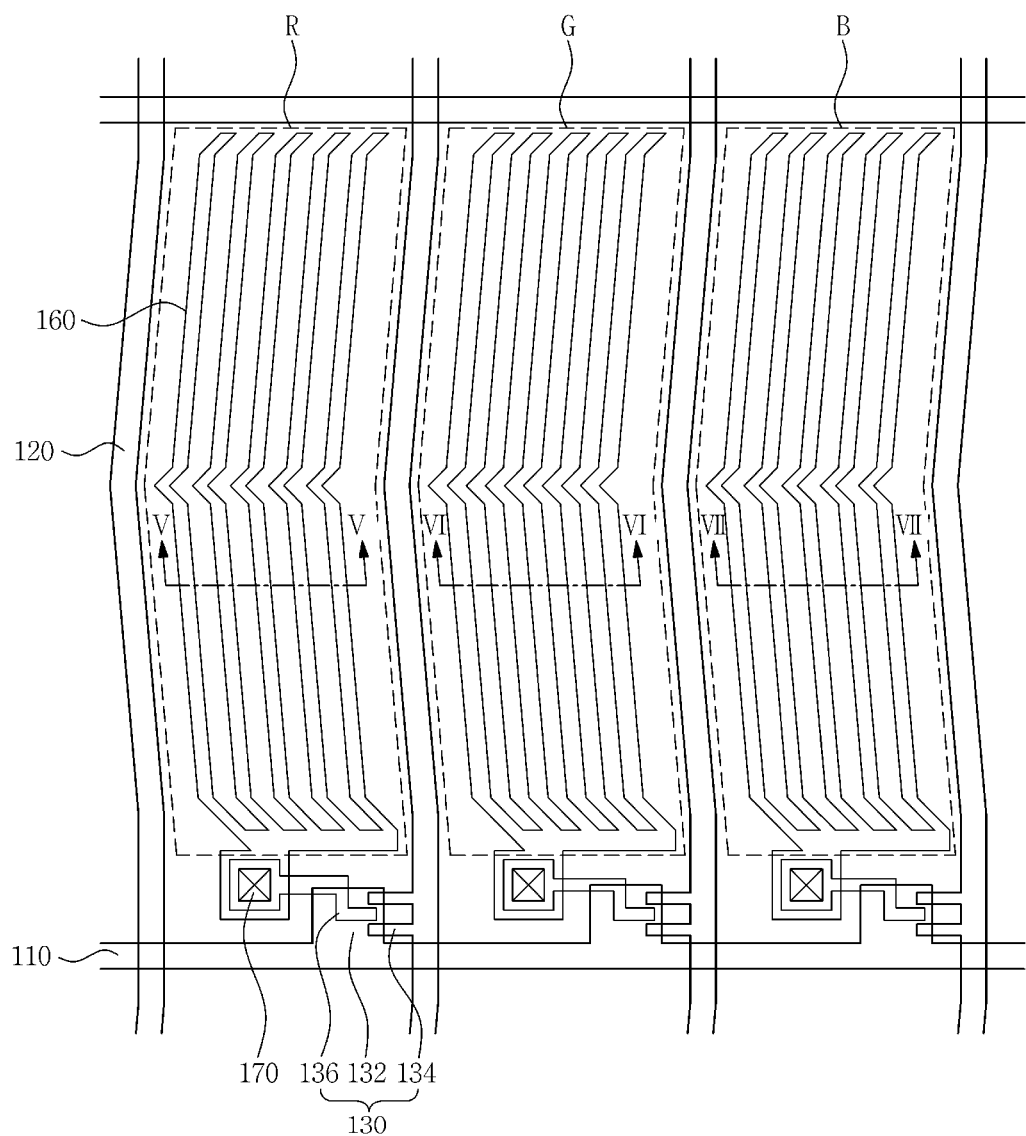
FIG. 7 is a plan view illustrating a display device according to another exemplary embodiment of the present invention.
Figure 8:
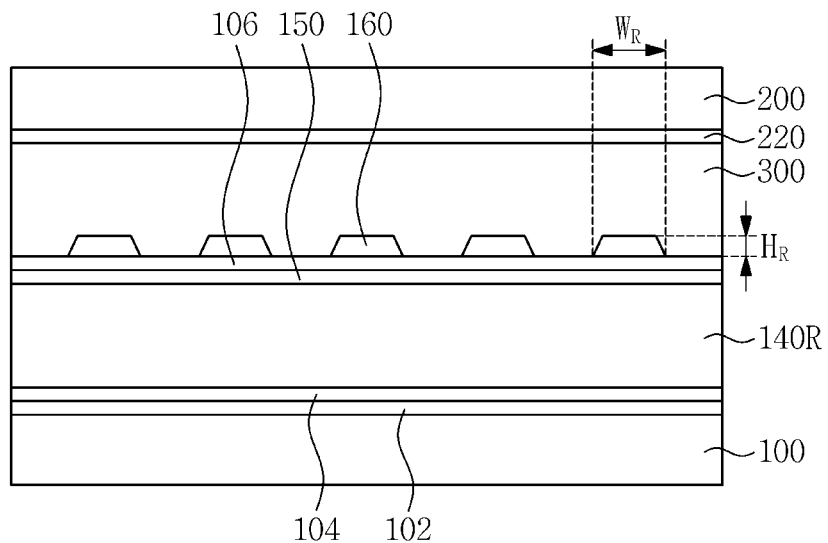
FIG. 8 is a cross-sectional view taken along line V-V' of FIG. 7.
Figure 9:
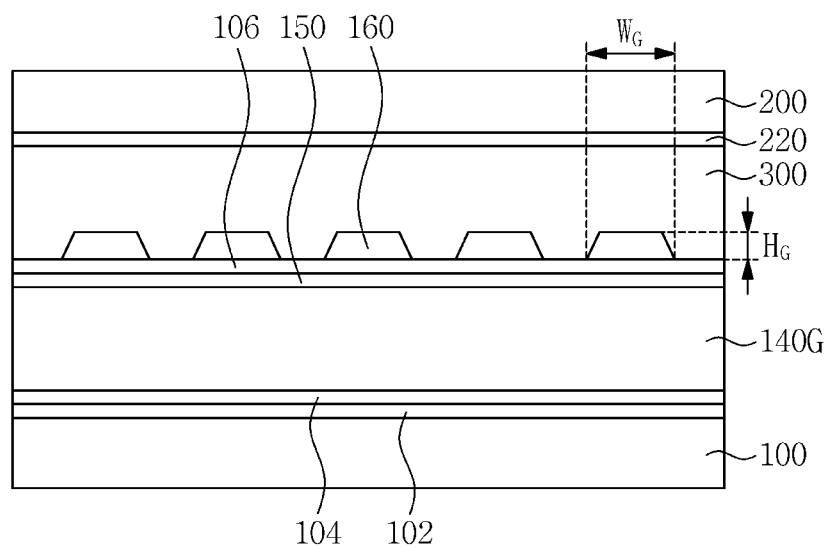
FIG. 9 is a cross-sectional view taken along line VI-VI' of FIG. 7.
Figure 10:
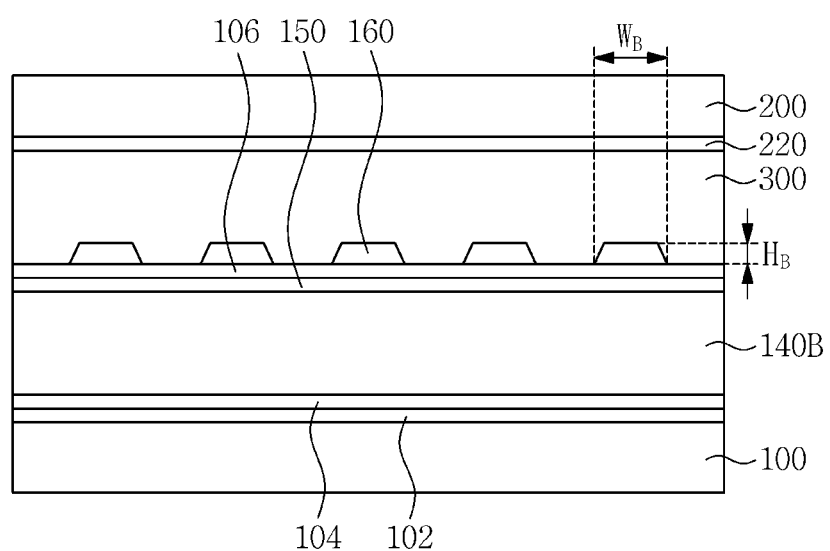
FIG. 10 is a cross-sectional view taken along line VII-VII' of FIG. 7.

FIG. 7 is a plan view illustrating a display device according to another exemplary embodiment of the present invention; FIG. 8 is a cross-sectional view taken along line V-V' of FIG. 7; FIG. 9 is a cross-sectional view taken along line VI-VI' of FIG. 7; and FIG. 10 is a cross-sectional view taken along line VII-VII' of FIG. 7.

Referring to FIGS. 7 through 10, since a display device according to another exemplary embodiment may have a configuration the same as that of the display device of FIG. 2 aside from an upper branch electrode 160, a repeated description thereof will be omitted for conciseness.

A width $W_G$ of the upper branch electrode 160 disposed in a green pixel region G may be greater than a width $W_R$ of the upper branch electrode 160 disposed in a red pixel region R, and may be greater than a width $W_B$ of the upper branch electrode 160 disposed in a blue pixel region B. In addition, a height $H_G$ of the upper branch electrode 160 disposed in the green pixel region G may be greater than a height $H_R$ of the upper branch electrode 160 disposed in the red pixel region R, and may be greater than a height $H_B$ of the upper branch electrode 160 disposed in the blue pixel region B.

The width $W_R$ and the height $H_R$ of the upper branch electrode 160 disposed in the red pixel region R may be the same as the width $W_B$ and the height $H_B$ of the upper branch electrode 160 disposed in the blue pixel region B, respectively.

The display device according to the other exemplary embodiment may compensate for the difference among the levels of the transmittance of the color filters 140R, 140G, and 140B disposed in the red, green, and blue pixel regions R, G, and B, respectively, by providing a width and a height of the upper branch electrode 160 disposed in the green pixel region G to be different from widths and heights of the upper branch electrodes 160 disposed in the red and blue pixel regions R and B, respectively.

As set forth above, according to exemplary embodiments of the present invention, the display device enhanced in side visibility and transmittance may be provided.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device, comprising:
a first substrate having a plurality of red, green, and blue pixel regions;
a lower electrode disposed on the red, green and blue pixel regions; and
an upper electrode disposed on the red, green and blue pixel regions, the upper electrode being insulated from the lower electrode, the upper electrode including a plurality of upper branch electrodes disposed on the lower electrode, a width and a height of the upper branch electrode in at least one of the red, green and blue pixel regions being respectively different from a width and a height of the upper branch electrode in another of the red, green and blue pixel regions, wherein the width and the height of the upper branch electrode in the green pixel region are respectively greater than the widths and the heights of the upper branch electrodes in the red and blue pixel regions.

2. The display device of claim 1, wherein the width and the height of the upper branch electrode in the red pixel region are respectively greater than the width and the height of the upper branch electrode in the blue pixel region.

3. The display device of claim 1, wherein the width and the height of the upper branch electrode in the red pixel region are respectively the same as the width and the height of the upper electrode in the blue pixel region.

4. The display device of claim 1, wherein the width of the upper electrode is from about 0.5 to 2.0 micrometers (μm).

5. The display device of claim 1, wherein the height of the upper electrode is from about 450 to 1000 angstroms (Å).

6. The display device of claim 1, wherein the lower electrode has a width greater than the width of the upper branch electrode.

7. The display device of claim 1, further comprising a thin film transistor (TFT) connected to the lower electrode or the upper electrode.

8. The display device of claim 1, further comprising a red color filter disposed in the red pixel region, a green color filter disposed in the green pixel region, and a blue color filter disposed in the blue pixel region.

9. The display device of claim 8, wherein the red, green, and blue color filters are disposed between the lower electrode and the first substrate.

10. The display device of claim 1, further comprising:
    a second substrate disposed to face the first substrate; and
    a liquid crystal layer interposed between the first and second substrates.

11. The display device of claim 10, further comprising a light shielding member disposed on the first substrate or the second substrate.

\* \* \* \* \*